US010466857B2

(12) United States Patent
Min et al.

(10) Patent No.: US 10,466,857 B2
(45) Date of Patent: Nov. 5, 2019

(54) MOBILE TERMINAL AND CONTROL METHOD THEREOF

(71) Applicant: LG Electronics Inc., Seoul (KR)

(72) Inventors: Jihye Min, Seoul (KR); Myoungeun Kim, Seoul (KR); Kunho Lee, Seoul (KR); Yongdeok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 13/963,209

(22) Filed: Aug. 9, 2013

(65) Prior Publication Data

US 2014/0258926 A1 Sep. 11, 2014

(30) Foreign Application Priority Data

Mar. 8, 2013 (KR) .......................... 10-2013-0025263

(51) Int. Cl.
*G06F 3/0482* (2013.01)
*G06F 3/0481* (2013.01)

(52) U.S. Cl.
CPC ........ *G06F 3/0482* (2013.01); *G06F 3/04817* (2013.01); *G06F 2203/04101* (2013.01); *G06F 2203/04108* (2013.01)

(58) Field of Classification Search
CPC ............... G06F 3/0482; G06F 3/04817; G06F 2203/04108; G06F 2203/04101; H04M 1/0254; H04M 1/72583; H04W 52/0267; G09G 2370/22
USPC ...................................... 710/15, 17; 345/156
See application file for complete search history.

(56) References Cited

U.S. PATENT DOCUMENTS

| 2008/0176604 A1* | 7/2008 | Kim ..................... G06F 3/04886 455/566 |
| 2008/0270637 A1* | 10/2008 | Cheah ................. G06F 13/4081 710/10 |
| 2010/0001967 A1* | 1/2010 | Yoo ....................... G06F 3/0488 345/173 |

(Continued)

FOREIGN PATENT DOCUMENTS

| KR | 10-2007-0063889 | * 6/2007 | ............... H01Q 1/24 |
| KR | 10-2010-0115226 | 10/2010 | |

(Continued)

OTHER PUBLICATIONS

Korean Office Action dated May 2, 2019 issued in Application 10-2013-0025263.

*Primary Examiner* — Nitin Patel
*Assistant Examiner* — Douglas M Wilson
(74) *Attorney, Agent, or Firm* — KED & Associates LLP

(57) ABSTRACT

The present disclosure relates to a mobile terminal capable of displaying screen information and a control method thereof. A mobile terminal according to an embodiment of the present disclosure may include a display unit formed to display screen information; an interface unit through which an external device is detachably connected to the mobile terminal; a sensing unit configured to sense whether the external device is coupled to or separated from at least one of which port included in the interface unit; and a controller configured to display graphic data corresponding to the sensing result of the sensing unit on the display unit and display at least one execution menu on the display unit to execute a function associated with the sensing result.

7 Claims, 17 Drawing Sheets

(56) References Cited

U.S. PATENT DOCUMENTS

| | | | |
|---|---|---|---|
| 2010/0004031 A1* | 1/2010 | Kim | H04M 1/274525 455/566 |
| 2010/0014007 A1* | 1/2010 | Kotani | G06F 3/1423 348/744 |
| 2011/0022203 A1* | 1/2011 | Woo | G06F 3/0482 700/94 |
| 2012/0052817 A1* | 3/2012 | Lee | H04W 52/0258 455/68 |
| 2012/0052918 A1* | 3/2012 | Yang | G06F 3/04817 455/566 |
| 2012/0053715 A1* | 3/2012 | McKillop | G06F 3/165 700/94 |
| 2012/0276953 A1 | 11/2012 | Kim et al. | |
| 2013/0067376 A1* | 3/2013 | Kim | G06F 3/0488 715/769 |
| 2013/0212702 A1* | 8/2013 | Niglio | G06F 21/6218 726/28 |
| 2013/0222338 A1* | 8/2013 | Gim | G06F 3/041 345/174 |
| 2013/0252637 A1* | 9/2013 | Cha | H04W 4/21 455/456.3 |
| 2013/0283212 A1* | 10/2013 | Zhu | G06F 3/0486 715/846 |
| 2014/0038557 A1* | 2/2014 | Kim | H04W 12/06 455/411 |
| 2014/0059494 A1* | 2/2014 | Lee | G06F 3/0482 715/835 |
| 2014/0195926 A1* | 7/2014 | Hussain | G06F 3/0488 715/750 |
| 2015/0121293 A1* | 4/2015 | Pickersgill | G06F 3/0237 715/780 |

FOREIGN PATENT DOCUMENTS

| | | | | |
|---|---|---|---|---|
| KR | 10-2011-0010376 | 2/2011 | | |
| KR | 10-2011-0021043 | 3/2011 | | |
| KR | 10-2012-0122051 | 11/2012 | | |
| WO | WO-2012079530 A1 * | 6/2012 | | G06F 3/0486 |
| WO | WO 2013184106 A1 * | 12/2013 | | G06F 3/0237 |
| WO | WO-2013184106 A1 * | 12/2013 | | G06F 3/0237 |

\* cited by examiner

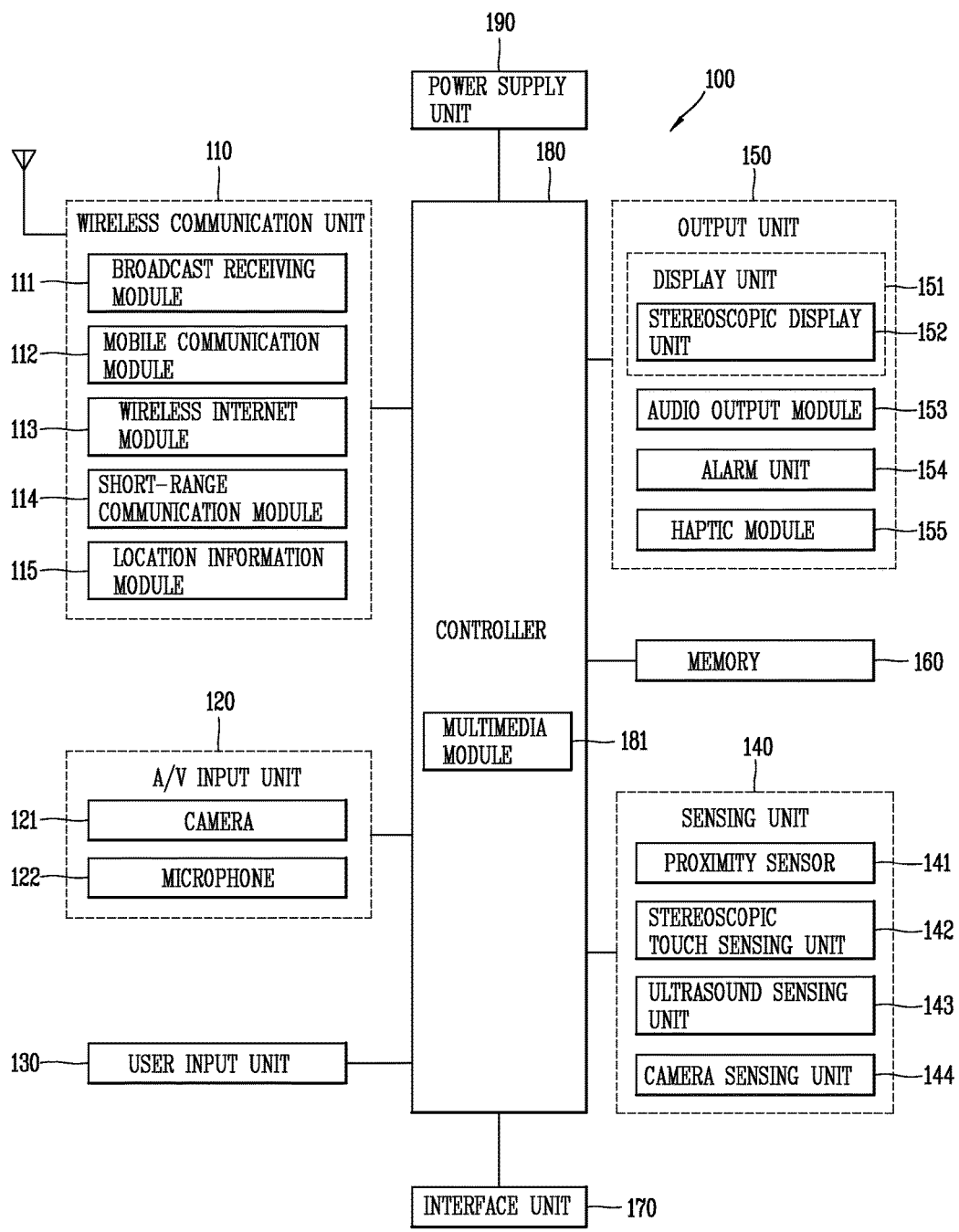

MOBILE TERMINAL AND CONTROL METHOD THEREOF

RELATED APPLICATION

Pursuant to 35 U.S.C. § 119(a), this application claims the benefit of earlier filing date and right of priority to Korean Application No. 10-2013-0025263, filed on Mar. 8, 2013, the contents of which is incorporated by reference herein in its entirety.

BACKGROUND OF THE INVENTION

1. Field of the Invention

The present disclosure relates to a mobile terminal, and more particularly, to a mobile terminal capable of displaying visual information and a control method thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

On the other hand, the terminal may display visual information on the display unit. The visual information may include at least one of text data and image data. Furthermore, the terminal may be coupled to an external device (for example, earphone) through an interface unit. However, when the user wants to execute an application (for example, music play application) associated with an external device coupled to the interface unit in a state that he or she views the visual information, several steps of processes may be carried out to execute an additional application, thereby causing inconvenience that several seconds are consumed.

SUMMARY OF THE INVENTION

An objective of the present disclosure is to provide a mobile terminal and control method thereof capable of enhancing the user's convenience when performing a multitasking function.

A mobile terminal according to an embodiment of the present disclosure may include a display unit formed to display visual information; an interface unit through which an external device is detachably connected to the mobile terminal; a sensing unit configured to sense whether the external device is coupled to or separated from at least one of which port included in the interface unit; and a controller configured to display graphic data corresponding to the sensing result of the sensing unit on the display unit and display at least one execution menu on the display unit to execute a function associated with the sensing result.

According to an embodiment, when the external device is coupled to or separated from any one of the at least one port, the controller may display graphic data indicating whether the external device is coupled thereto or separated therefrom in a region adjacent to the port on the display unit.

According to an embodiment, the controller may display the graphic data to be overlapped with visual information previously displayed on the display unit.

According to an embodiment, the controller may generate a new region while allowing at least part of the visual information previously displayed on the display unit to disappear, and display the graphic data in the generated region.

According to an embodiment, the controller may terminate the graphic data being displayed in the generated region when a predetermined period of time has passed, and display the at least one execution menu in the generated region.

According to an embodiment, the controller may recommend at least one application based on at least one of the type of the external device and whether or not it is coupled to the external device, and display an icon corresponding to the recommended application in the generated region.

According to an embodiment, when any one of icons corresponding to the recommended application is selected, the controller may display the execution screen of an application corresponding to the selected icon to be overlapped with an icon corresponding to the recommended application.

According to an embodiment, the external device may include an earphone, and the controller may display a setting screen for setting volume information when a predetermined touch input is sensed on the execution menu.

According to an embodiment, when a touch input is not sensed on the display unit for a predetermined period of time, the controller may terminate the execution menu being displayed on the display unit.

According to an embodiment, when a touch input is sensed in a different region other than the generated region on the display unit, the controller may terminate the execution menu being displayed on the display unit.

According to an embodiment, an icon displayed in the generated region may include a setting icon associated with the setting of an icon to be displayed in the execution menu, and the controller may display a setting screen for selecting at least one of the type of the icon to be displayed and the arrangement method of the icon to be displayed in the execution menu on the display unit when the setting icon is selected.

According to an embodiment, the controller may group the at least one recommended application into a plurality of groups, and display group icons corresponding to the plurality of groups, respectively, in the generated region.

According to an embodiment, when any one of the group icons is selected, the controller may display a popup window containing icons corresponding to a plurality of applications grouped with a group corresponding to the selected group icon on the display unit.

According to an embodiment, the mobile terminal may further include a body, and wherein the external device may include a DMB antenna, and the controller may execute a DMB application and display an execution screen of the DMB application on the display unit when the DMB antenna being withdrawn from the body by a predetermined length is sensed.

According to an embodiment, the controller may detect the length information of the DMB antenna being withdrawn from the body, and allow at least part of the visual information previously displayed on the display unit to disappear based on the detected length information, and display an execution screen of the DMB application in a region from which at least part of the visual information disappears.

An embodiment of the present disclosure relates to a control method of a mobile terminal including a display unit formed to display visual information and an interface unit through which an external device is detachably connected to the mobile terminal. A control method of the mobile terminal may include sensing whether the external device is coupled to or separated from at least one of which port included in the interface unit; displaying graphic data corresponding to the sensing result on the display unit; and displaying at least one execution menu on the display unit to execute a function associated with the sensing result.

According to an embodiment, said displaying graphic data corresponding to the sensing result on the display unit may include displaying graphic data indicating whether the external device is coupled thereto or separated therefrom in a region adjacent to the port on the display unit when the external device is coupled to or separated from any one of the at least one port.

According to an embodiment, said displaying at least one execution menu on the display unit to execute a function associated with the sensing result may include recommending at least one application based on at least one of the type of the external device and whether or not it is coupled to the external device; and displaying an icon corresponding to the recommended application in the generated region.

The above references are incorporated by reference herein where appropriate for appropriate teachings of additional or alternative details, features and/or technical background.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

The embodiments will be described in detail with reference to the following drawings in which like reference numerals refer to like elements wherein:

In the drawings:

FIG. 1 is a block diagram illustrating a mobile terminal according to an embodiment disclosed in the present disclosure;

FIGS. 2A and 2B are conceptual views illustrating a communication system in which a mobile terminal according to the present disclosure is operable;

FIG. 3A is a front perspective view illustrating an example of a mobile terminal associated with the present disclosure;

FIG. 3B is a rear perspective view illustrating a mobile terminal illustrated in FIG. 3A;

FIG. 4 is a flow chart for explaining a mobile terminal according to an embodiment of the present disclosure;

FIGS. 5 and 6 are conceptual views illustrating visual information displayed on the display unit when an external device is coupled to an interface unit;

FIGS. 7 and 8 are conceptual views illustrating an execution screen of an application corresponding to an icon selected from an execution menu;

FIG. 9 is a conceptual view illustrating an embodiment of controlling volume information in an execution menu;

FIGS. 10 and 11 are conceptual views illustrating an embodiment of allowing an execution menu displayed on the display unit to disappear;

FIGS. 12 and 13 are conceptual views illustrating an embodiment of editing an execution menu;

FIG. 14 is a conceptual view illustrating an embodiment of displaying a group icon of applications as an execution menu;

Figure 15:
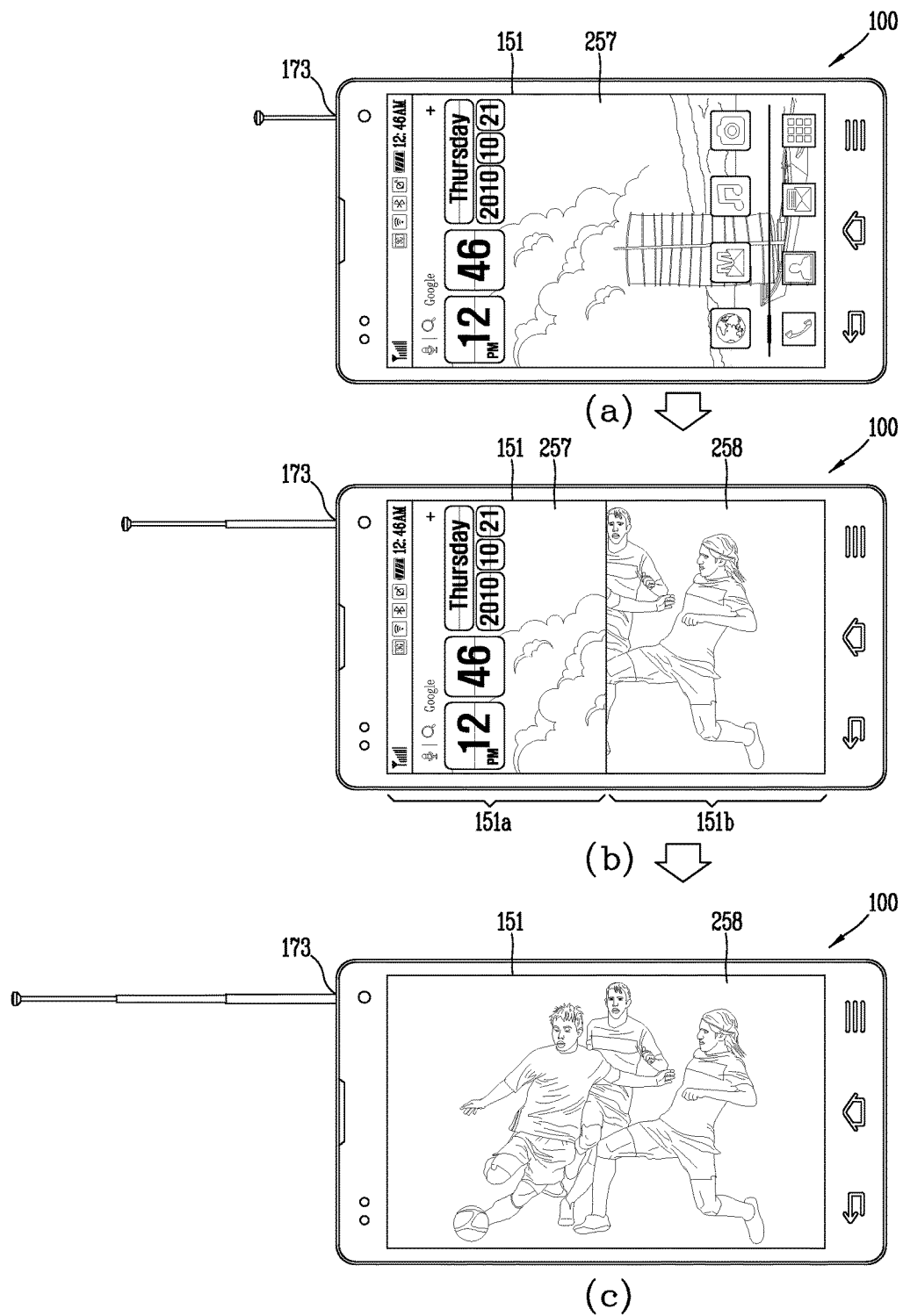
Figure 16:
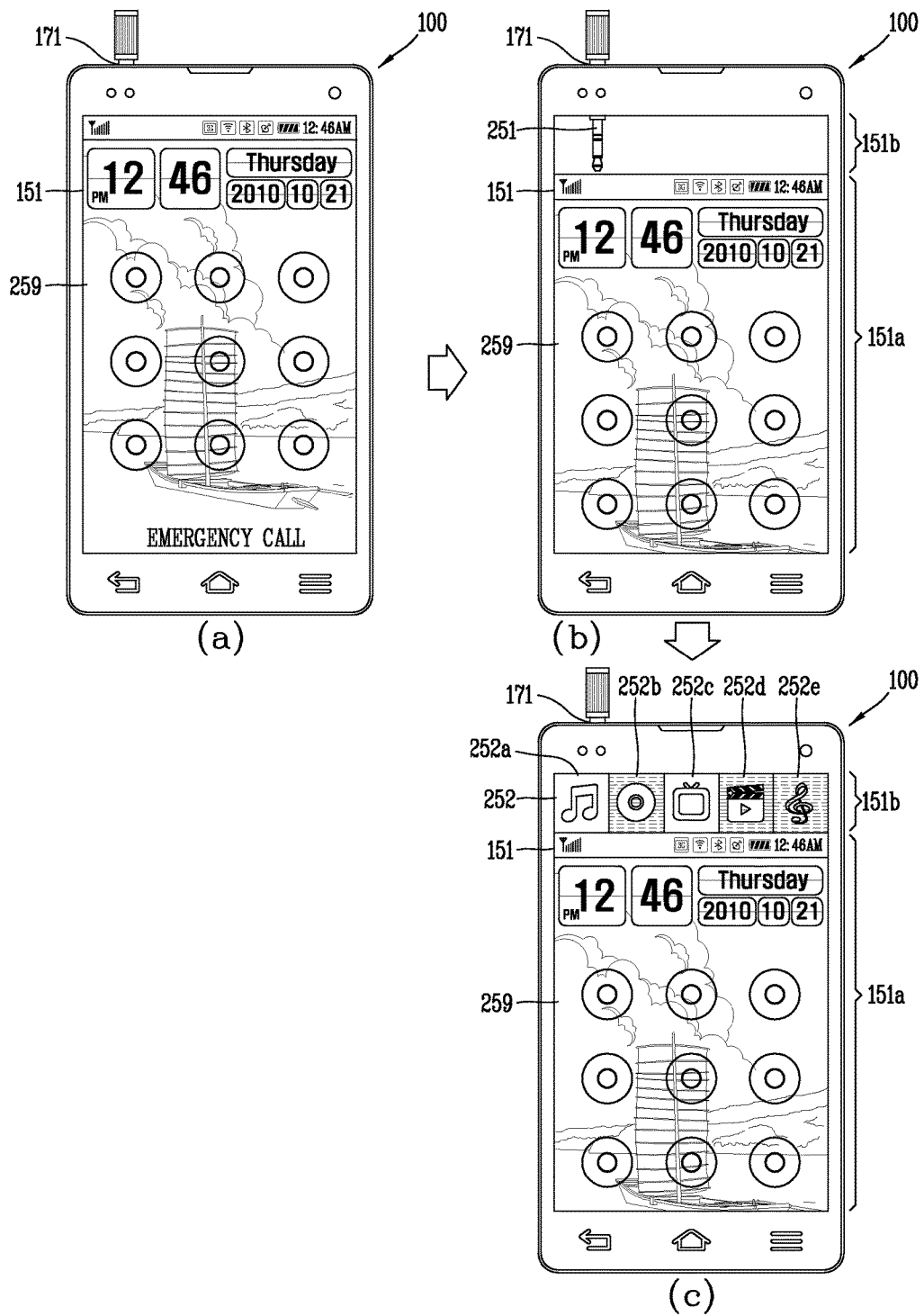

FIG. 15 is a conceptual view illustrating an embodiment of immediately executing an application when an external device is withdrawn from an interface unit; and FIG. 16 is a conceptual view illustrating visual information displayed on the display unit when an external device is coupled to an interface unit in a state that a lock screen is displayed on the display unit.

DETAILED DESCRIPTION OF THE INVENTION

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store data input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2A:
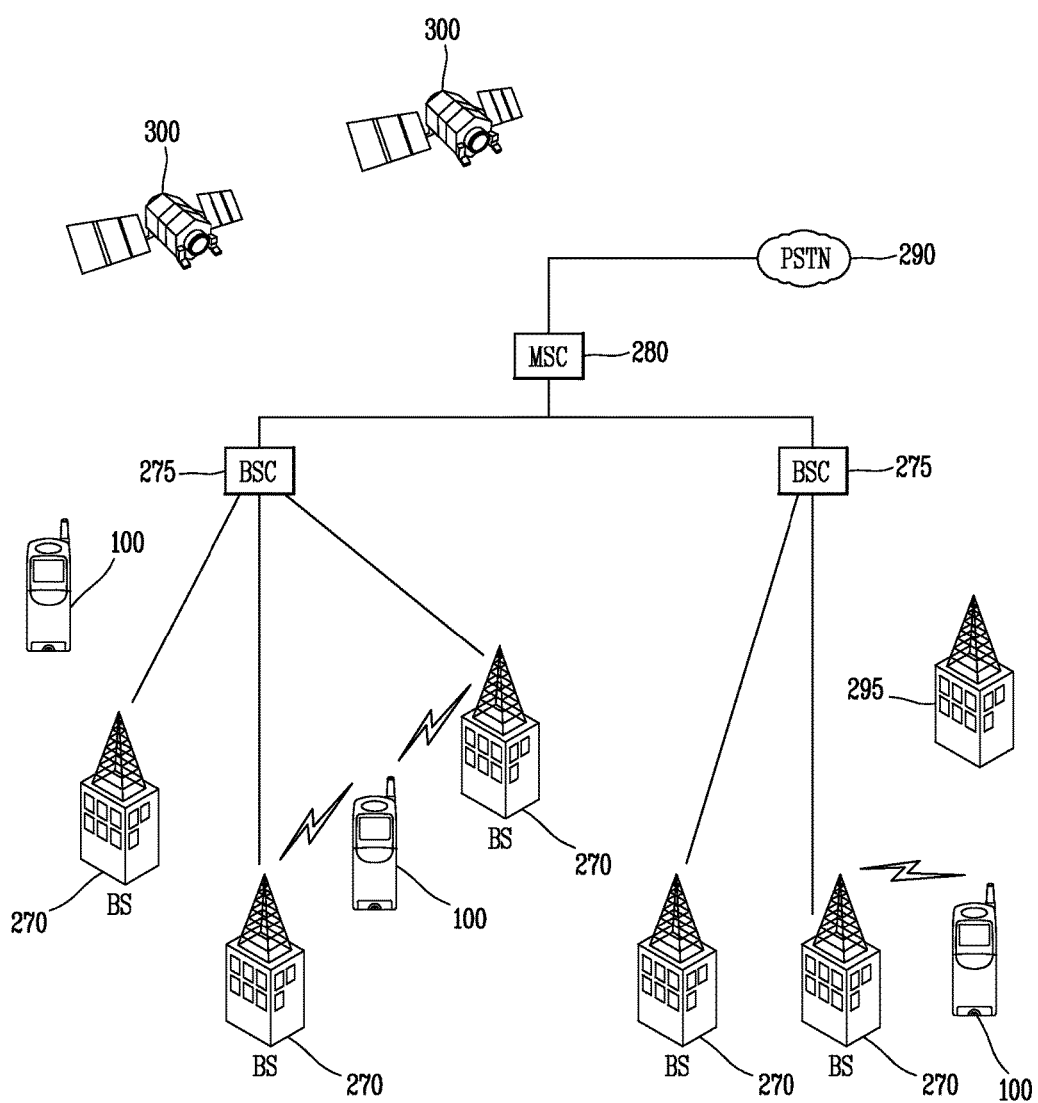
Figure 2B:
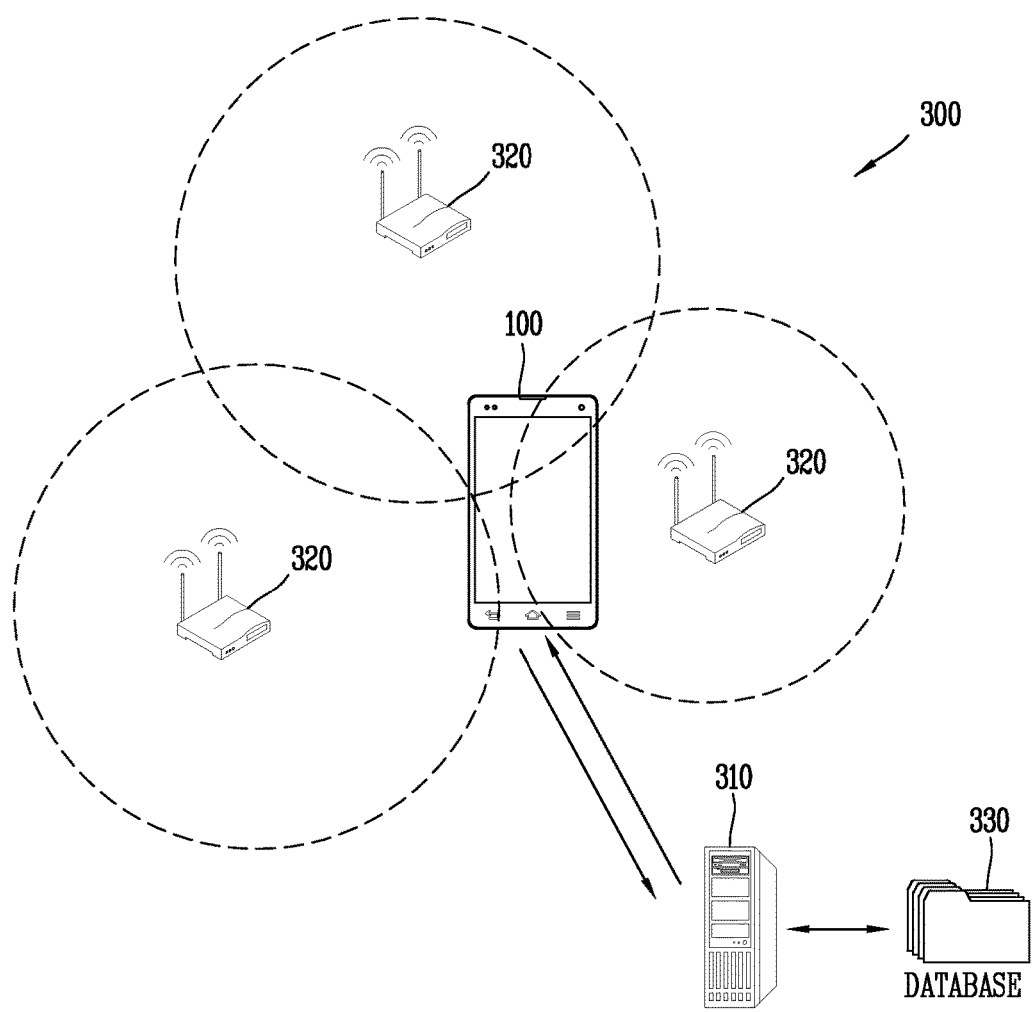

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
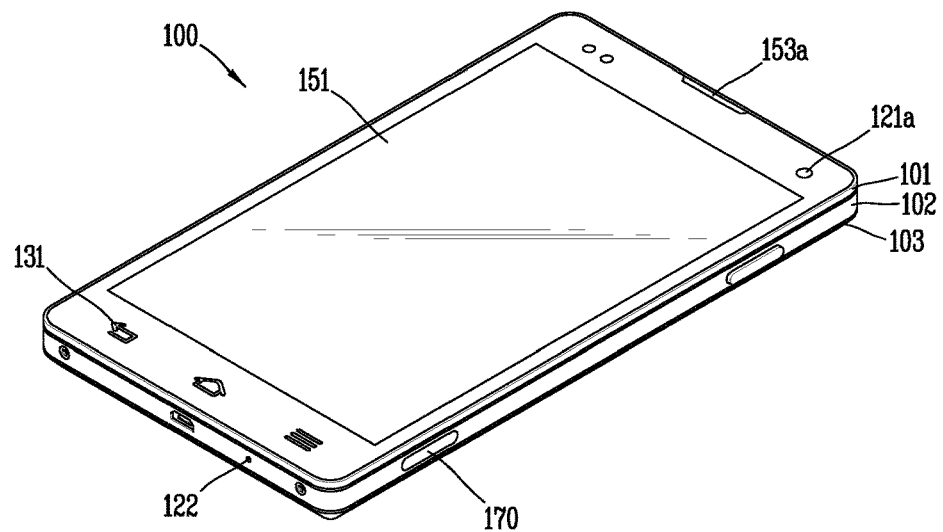

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153$a$, a first camera 121$a$, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
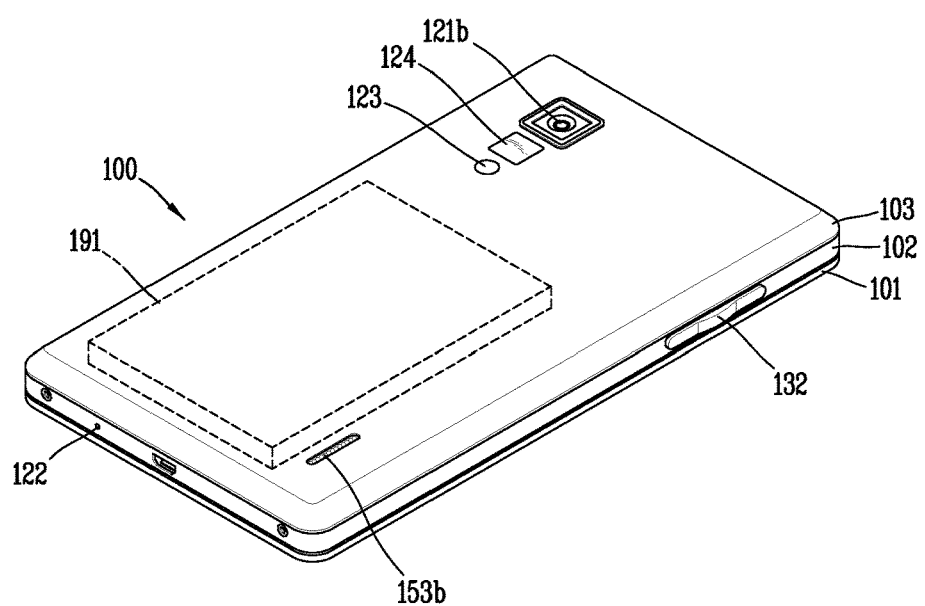

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

On the other hand, the mobile terminal 100 may display visual information (or screen information, hereinafter "screen information") on the display unit 151. The screen information may include at least one of text data and image data. Furthermore, the mobile terminal 100 may be coupled to an external device (for example, earphone) through the interface unit 170. However, when the user wants to execute an application (for example, music play application) associated with an external device coupled to the interface unit 170 in a state that he or she views the screen information, several steps of processes may be carried out to execute an additional application, thereby causing inconvenience that several seconds are consumed.

Accordingly, hereinafter, a mobile terminal 100 capable of enhancing the user's convenience when performing a multitasking function and a control method thereof will be described with reference to the accompanying drawings.

Figure 4:
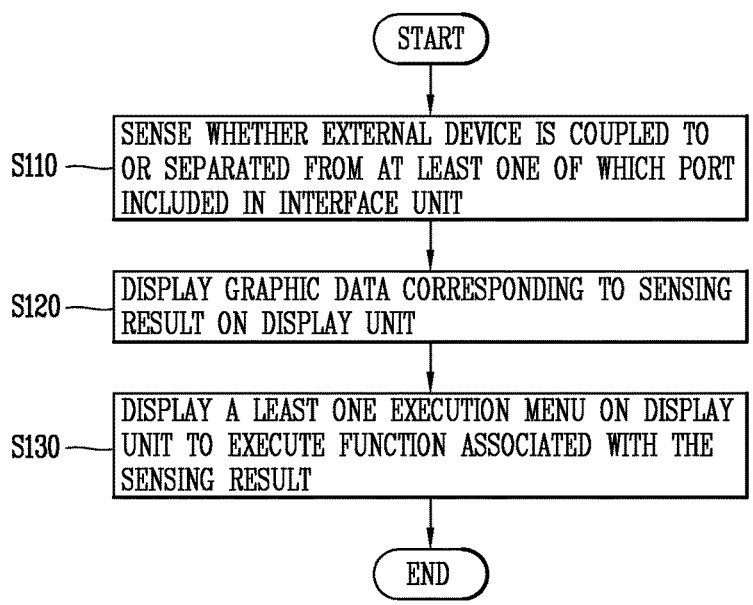

FIG. 4 is a flow chart for explaining the mobile terminal 100 (refer to FIG. 1) according to an embodiment of the present disclosure. The mobile terminal 100 may include a display unit 151 (refer to FIG. 1), an interface unit 170 (refer to FIG. 1), a sensing unit 140 (refer to FIG. 1) and a controller 180 (refer to FIG. 1).

Referring to FIG. 4, first, the process (S110) of sensing whether the external device is coupled to or separated from at least one of which port included in the interface unit 170 is carried out.

The interface unit 170 may be formed to be detachable with respect to an external device. The interface unit 170 may include at least one port configured to be detachable with respect to an external device. For example, the interface unit 170 may include a port configured to be detachable with respect to an earphone connector, a port configured to be detachable with respect to a USB connector, a port configured to withdraw a DMB antenna, and the like. The earphone connector and USB connector may transfer a voltage generated from the earphone and external electronic device, respectively, to the body of the mobile terminal 100 through the port.

The sensing unit 140 may sense whether the external device is coupled to or separated from a port. Furthermore, the sensing unit 140 may sense that the external device is withdrawn from a port. The sensing unit 140 may transfer a sensing result to the controller 180.

Next, the process (S120) of displaying graphic data corresponding to the sensing result on the display unit 151 is carried out.

Specifically, when the external device is coupled to or separated from any one of the at least one port, the controller 180 may display graphic data indicating that the external device is coupled thereto or separated therefrom in a region adjacent to the port on the display unit 151.

The controller 180 may display graphic data to be overlapped with screen information previously displayed on the display unit 151. Meanwhile, the controller 180 may generate a new region while allowing at least part of the screen information previously displayed on the display unit 151 to disappear, and display the graphic data in the generated region.

For example, when an earphone connector is coupled to an earphone port, the controller 180 may display graphic data (for example, an image having the shape of an earphone connector) indicating that an earphone is connected thereto in a region adjacent to the earphone port. Accordingly, an emotional effect indicating that an earphone connector is coupled to an earphone port may be provided to the user.

Then, the process (S130) of displaying at least one execution menu on the display unit 151 to execute a function associated with the sensing result is carried out.

When a predetermined period of time has passed in a state that graphic data is displayed on the display unit 151, the controller 180 may allow the graphic data to disappear, and display at least one execution menu in a region from which the graphic data disappears. Here, the execution menu may include an icon corresponding to an application associated with the sensing result.

The controller 180 may recommend at least one application based on at least one of the type of the external device and whether or not it is coupled to the external device. The controller 180 may display an icon corresponding to the recommended application as an execution menu.

Then, though not shown in the drawing, when any one icon is selected from the execution menu, the controller 180 may execute an application corresponding to the selected icon, and display the execution screen of the application on the display unit 151.

On the other hand, though not shown in the drawing, the number of applications recommended based on at least one of the type of the external device and whether or not it is coupled to the external device is one, the controller 180 may immediately execute the recommended application without displaying the execution menu 252 on the display unit 151.

Furthermore, though not shown in the drawing, the foregoing embodiment may be applicable even when the external device is separated from the port. Meanwhile, a graphic image indicating that the external device is separated therefrom may be displayed on the display unit 151 when the external device is separated therefrom in a state that the execution menu is displayed on the display unit 151, and there may be no change in screen information displayed on the display unit 151 when the external device is separated therefrom in a state that the execution menu is not displayed on the display unit 151.

As described above, according to the present disclosure, when the mobile terminal 100 is coupled to an external device (for example, earphone) through the interface unit 170, graphic data indicating that it is coupled to the external device may be displayed on the display unit 151. Accordingly, emotional pleasure may be provided to the user.

Furthermore, according to the present disclosure, an execution menu may be displayed on the display unit 151 to execute a function associated with the external device. Accordingly, an application associated with the external device may be immediately executed based on the user's selection. In other words, an entry path for executing a function associated with the external device may be provided with a unified control action in a state that any screen information is displayed on the display unit 151. Accordingly, the user may use a function associated with the external device even without performing a complicated manipulation during the multitasking process. As a result, it may be possible to enhance the user's convenience.

Figure 5:
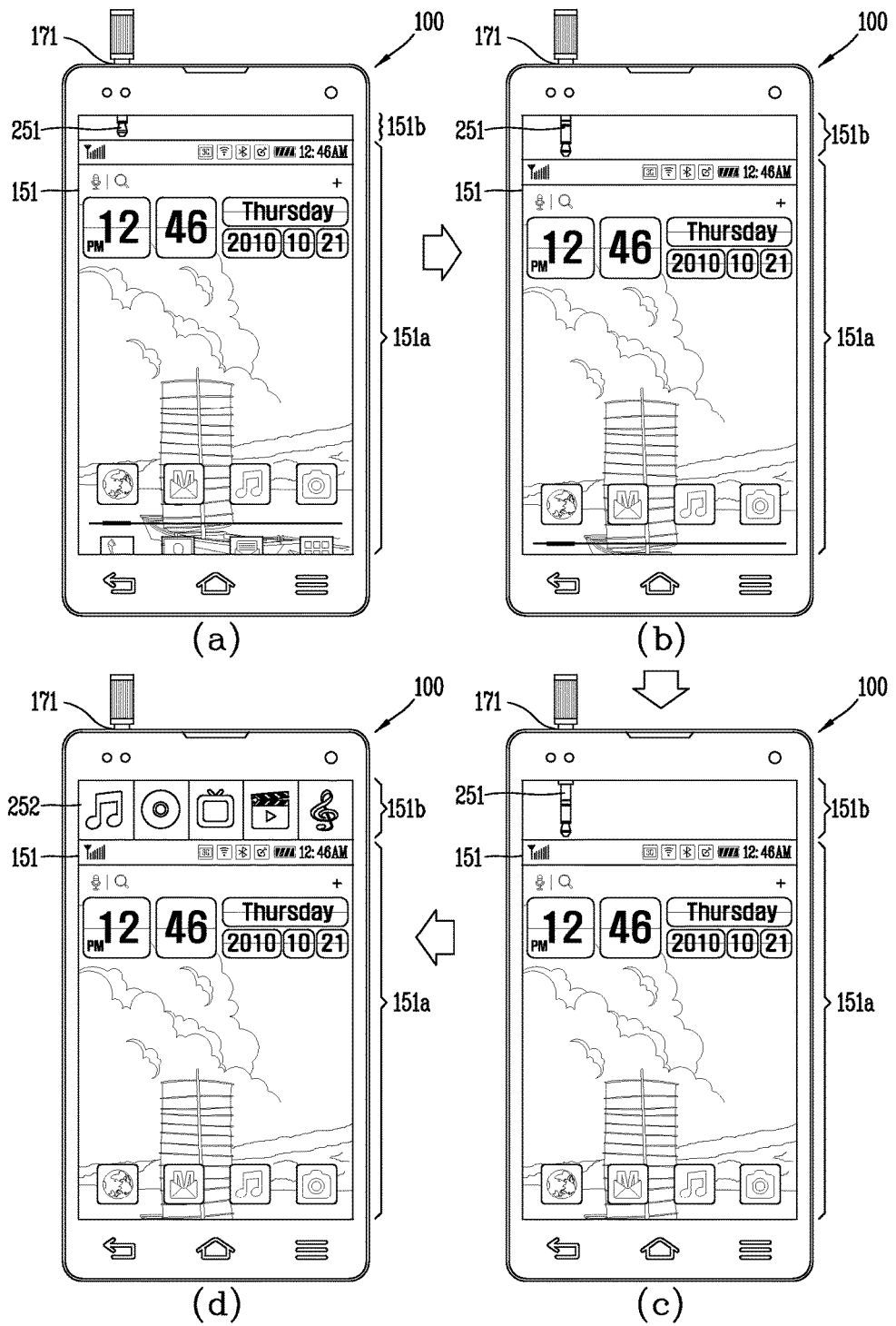
Figure 6:
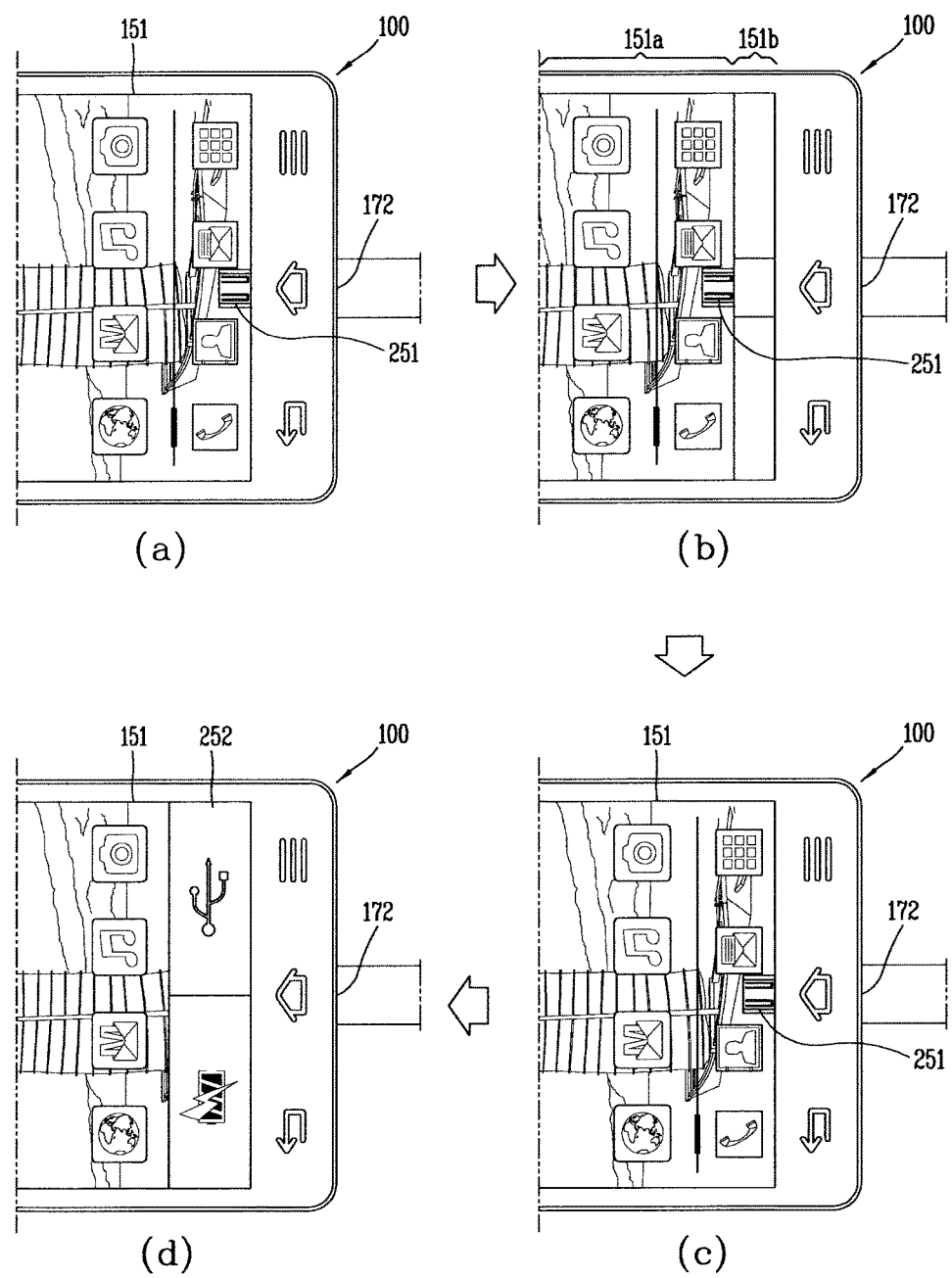

FIGS. 5 and 6 are conceptual views illustrating screen information displayed on the display unit 151 when an external device is coupled to the interface unit 170.

Referring to FIG. 5A, the interface unit 170 may include an earphone port 171 that can be coupled to an earphone connector. The display unit 151 may display a home screen.

As illustrated in the drawing, when an earphone connector is coupled to the earphone port 171, the controller 180 may display graphic data indicating that the body is connected to an earphone on the display unit 151.

Specifically, when an earphone connector is connected to the earphone port 171, the controller 180 may divide the display unit 151 into a first and a second region 151*a*, 151*b* while allowing at least part of the home screen to disappear. The controller 180 may display the home screen in the first region 151*a*, and display graphic data (for example, an image having the shape of an earphone connector) in the second region 151*b*.

Referring to FIGS. 5B and 5C, the controller 180 may change the size of the first and the second region 151*a*, 151*b*. Specifically, when an earphone connector is coupled to the earphone port 171, the controller 180 may increase the size of the second region 151*b* by a predetermined value (for example, a value based on the size information of the earphone connector), and decrease the size of the first region 151*a* by a predetermined length.

As gradually increasing the size of the second region 151b, the size of the graphic data may be gradually increased. Furthermore, as gradually decreasing the sized of the first region 151a, a larger portion of the home screen may disappear. Accordingly, the controller 180 may provide an emotional effect indicating that an earphone connector is being gradually inserted into the earphone port 171 to the user.

As described above, it is illustrated in FIGS. 5A through 5C that the earphone connector is completely coupled to the earphone port 171, and then graphic data is displayed and the size of the graphic data is increased to a predetermined size. Meanwhile, though not shown in the drawing, graphic data may be displayed from a time point at which the earphone connector is brought into contact with the earphone port 171, and the size of the graphic data may be gradually increased to a time point at which the earphone connector is completely coupled thereto.

Then, as illustrated in FIG. 5D, when a predetermined period of time has passed in a state that graphic data is displayed on the display unit 151, the controller 180 may allow the graphic data to disappear, and display at least one execution menu 252 in a region from which the graphic data disappears. Here, the execution menu 252 may include an icon corresponding to an application associated with the earphone.

As illustrated in the drawing, the execution menu 252 may include an icon corresponding to an application associated with music play, an icon corresponding to an application associated with DMB play, an icon corresponding to an application associated with video play, and the like.

In this manner, an icon displayed on the execution menu 252 may be set directly by the user, or may be set by the controller 180. For example, the controller 180 may select an icon displayed on the execution menu 252 based on the user's use pattern information. Specifically, the controller 180 may collect statistic information associated with which application is executed by the user at normal times using his or her earphone, and select an icon displayed on the execution menu 252 using the collected information.

Though an embodiment in which five icons are displayed on the execution menu 252 is illustrated in FIG. 5D, the number of icons displayed on the execution menu 252 may be varied. Furthermore, when all icons are not displayed on one screen, the other icons may be displayed based on a predetermined touch input (for example, drag input).

Referring to FIGS. 6A through 6C, the interface unit 170 may include a USB port 172 that can be coupled to a USB connector. The display unit 151 may display a home screen.

As described above, when a USB connector is coupled to the USB port 172, the controller 180 may display graphic data indicating that the body is connected to a USB on the display unit 151.

Specifically, when a USB connector is coupled to the USB port 172, as illustrated in FIG. 6A, the controller 180 may display graphic data (for example, an image having the shape of a USB connector) to be overlapped with the home screen.

Next, referring to FIG. 6B, the controller 180 may divide the display unit 151 into a first and a second region 151a, 151b while allowing at least part of the home screen to disappear. The controller 180 may display the home screen in the first region 151a, and display graphic data in the second region 151b. Then, referring to FIG. 6C, the controller 180 may allow the first and the second region 151a, 151b to disappear, and display graphic data again to be overlapped with the home screen.

Then, as illustrated in FIG. 6D, when a predetermined period of time has passed in a state that graphic data is displayed on the display unit 151, the controller 180 may allow the graphic data to disappear, and display at least one execution menu 252 in a region from which the graphic data disappears. Here, the execution menu 252 may include an icon corresponding to a function associated with a USB.

As illustrated in the drawing, the execution menu 252 may include an icon corresponding to a charging function and a function for connecting to the external device.

Figure 7:
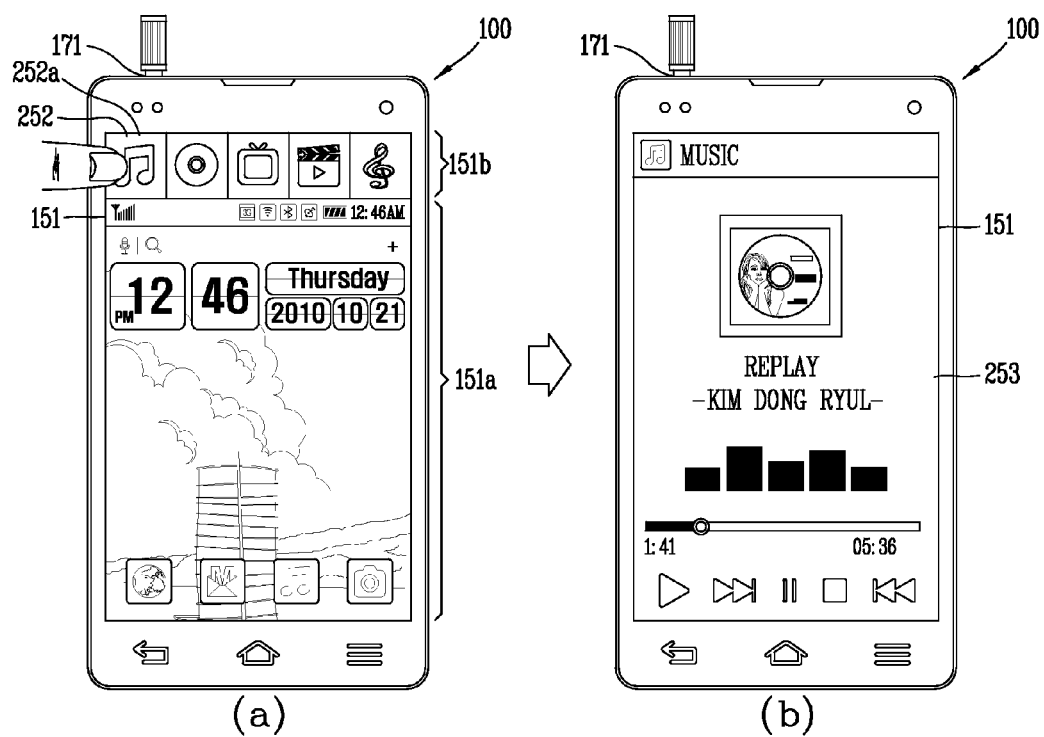
Figure 8:
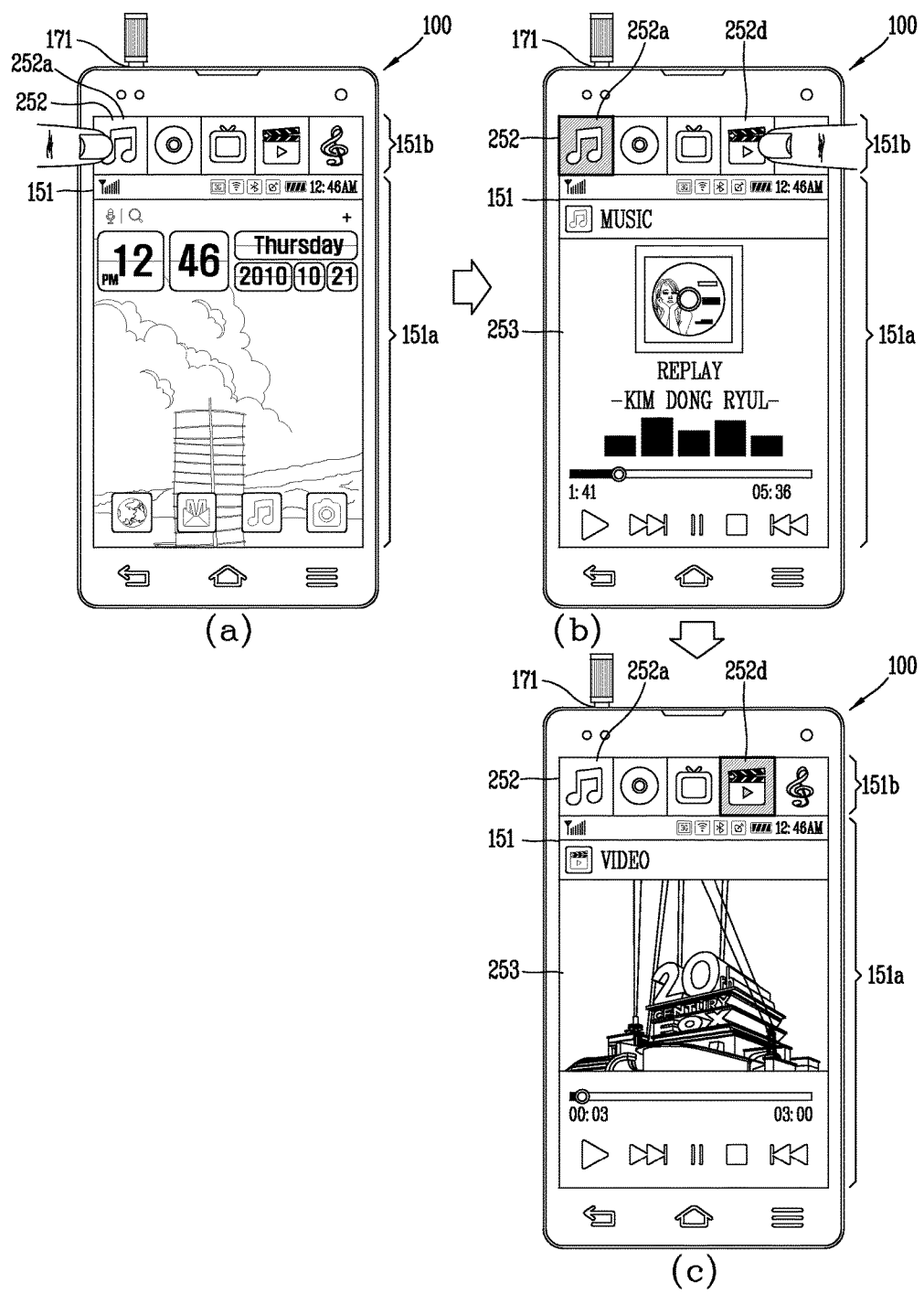

FIGS. 7 and 8 are conceptual views illustrating the execution screen of an application corresponding to an icon selected from the execution menu.

Referring to FIGS. 7A and 8A, the controller 180 may display at least one execution menu 252 in a region from which an image having the shape of an earphone connector disappears. Here, the execution menu 252 may include an icon corresponding to an application associated with the earphone.

At this time, when any one (for example, an icon corresponding to a music play application) 252a of icons displayed on the execution menu 252 is selected, the controller 180 may execute the music play application.

As illustrated in FIG. 7B, the controller 180 may display the execution screen 253 of the music play application in the entire region of the display unit 151.

On the other hand, as illustrated in FIG. 8B, the controller 180 may display the execution screen 253 of the music play application to be overlapped with the execution menu 252. At this time, as illustrated in the drawing, an icon 252a corresponding to the music play application currently being played among icons displayed on the execution menu 252 may be displayed to be distinguished from the other icons. For example, the icon 252a corresponding to the music play application displays at least one of the color, shape, size, brightness and three-dimensional depth value in a different manner from that of the other icons.

When another one (for example, an icon corresponding to a video play application) 252d of icons displayed on the execution menu 252 is selected in a state that the execution screen 253 of the music play application is displayed on the display unit 151, the controller 180 may execute the video play application.

Accordingly, as illustrated in FIG. 8C, the controller 180 may display the execution screen 253 of the video play application on the display unit 151.

Figure 9:
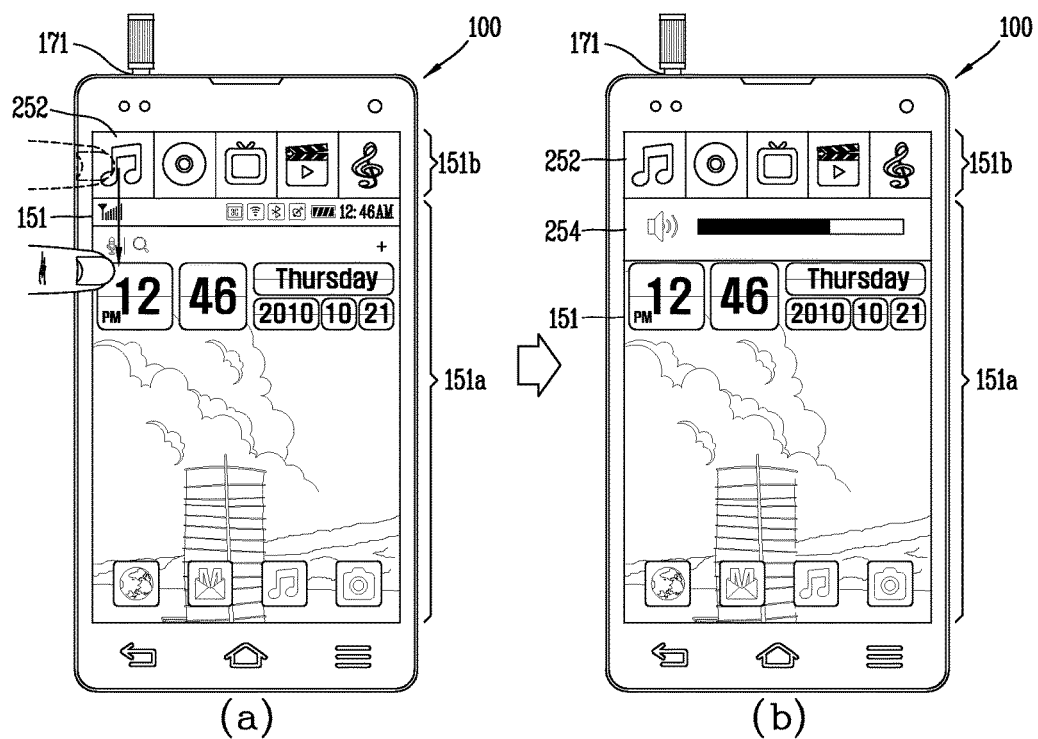

FIG. 9 is a conceptual view illustrating an embodiment of controlling volume information in the execution menu.

Referring to FIG. 9A, the controller 180 may display at least one execution menu 252 in a region from which an image having the shape of an earphone connector disappears. Here, the execution menu 252 may include an icon corresponding to an application associated with the earphone.

At this time, when a predetermined touch input is sensed on the execution menu 252, the controller 180 may display a setting screen for setting volume information on the display unit 151.

Specifically, when the execution menu 252 is dragged in the first direction (for example, top-down direction), as illustrated in FIG. 9B, the controller 180 may display a popup window 254 for setting volume information in a region adjacent to the execution menu 252.

Though an embodiment in which an earphone connector is coupled to the earphone port 171 is illustrated in the drawing, when a predetermined touch input is sensed on the execution menu 252 in a situation that a USB connector is coupled to the USB port 172, the controller 180 may display a setting screen for performing a setting associated with USB connection on the display unit 151.

Furthermore, though not shown in the drawing, when a popup window for setting volume information is dragged in the second direction (for example, down-top direction), the controller 180 may allow a popup window 254 for setting volume information to disappear from the display unit 151 while storing the set volume information.

Figure 10:
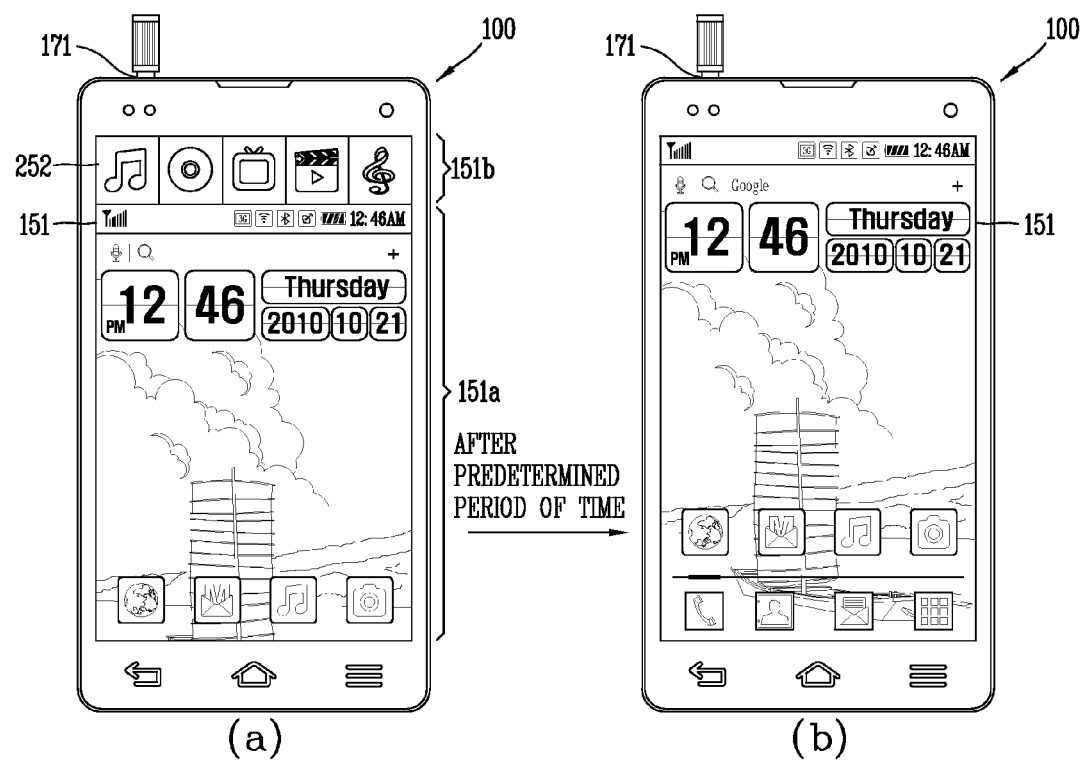
Figure 11:
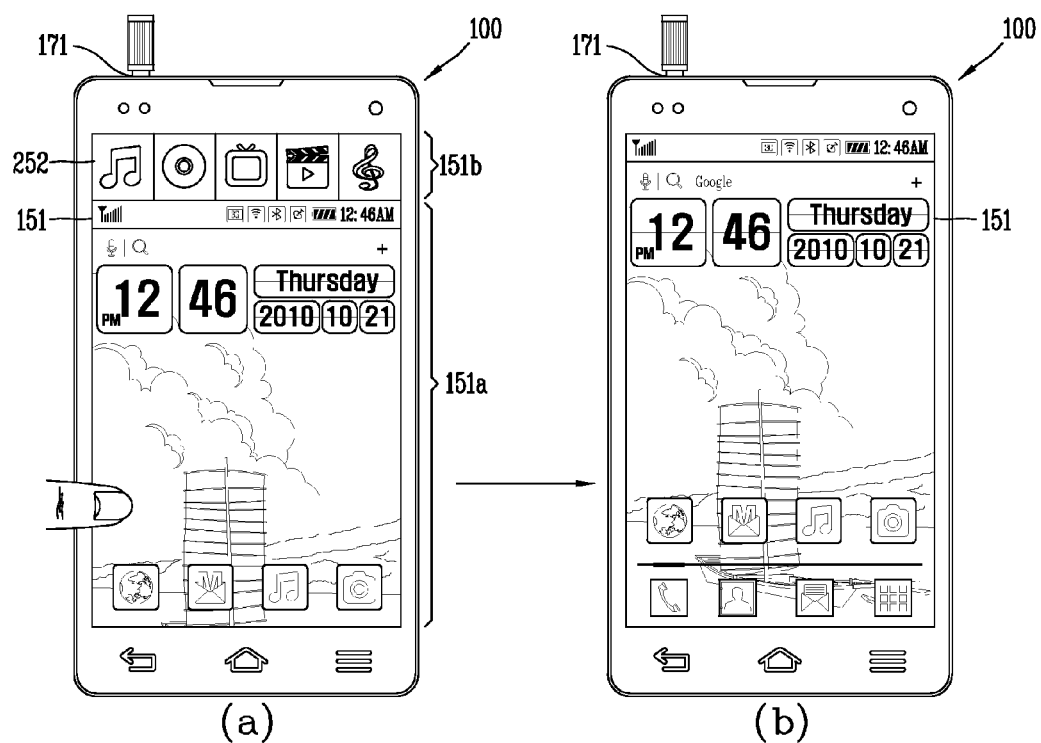

FIGS. 10 and 11 are conceptual views illustrating an embodiment of allowing the execution menu 252 displayed on the display unit 151 to disappear.

Referring to FIGS. 10A and 11A, the controller 180 may display at least one execution menu 252 in a region from which an image having the shape of an earphone connector disappears. Here, the execution menu 252 may include an icon corresponding to an application associated with the earphone.

Referring to FIGS. 10A and 10B, when a touch input is not sensed on the display unit 151 for a predetermined period of time, the controller 180 may terminate the execution menu 252 being displayed on the display unit 151. Accordingly, as illustrated in the drawing, the controller 180 may merge the first and the second region 151a, 151b again, and display the home screen previously displayed on the display unit 151 again.

On the other hand, referring to FIGS. 11A and 11B, when a touch input is sensed on a different region other than the second region 151b displayed with the execution menu 252 on the display unit 151, namely, the first region 151a, the controller 180 may terminate the execution menu 252 being displayed on the display unit 151. Accordingly, as illustrated in the drawing, the controller 180 may merge the first and the second region 151a, 151b again, and display the home screen previously displayed on the display unit 151 again.

On the other hand, though not shown in the drawing, even when an input is applied to a hard key (for example, home key) in a state that the execution menu 252 is displayed on the display unit 151, the controller 180 may terminate the execution menu 252 being displayed on the display unit 151.

Furthermore, even when an earphone connector is separated from the earphone port 171 in a state that the execution menu 252 is displayed on the display unit 151, the controller 180 may terminate the execution menu 252 being displayed on the display unit 151.

On the other hand, though not shown in the drawing, when a predetermined touch input is sensed even in a state that the execution menu 252 disappears from the display unit 151, the controller 180 may display the execution menu 252 again on the display unit 151.

Furthermore, though an embodiment in which the execution menu 252 is displayed to be fixed to one region of the display unit 151 is illustrated in the drawing, the execution menu 252 may be displayed on a popup window. In this case, a popup window displayed with the execution menu 252 may be moved and displayed in another region of the display unit 151 based on a touch input applied to the popup window.

Figure 12:
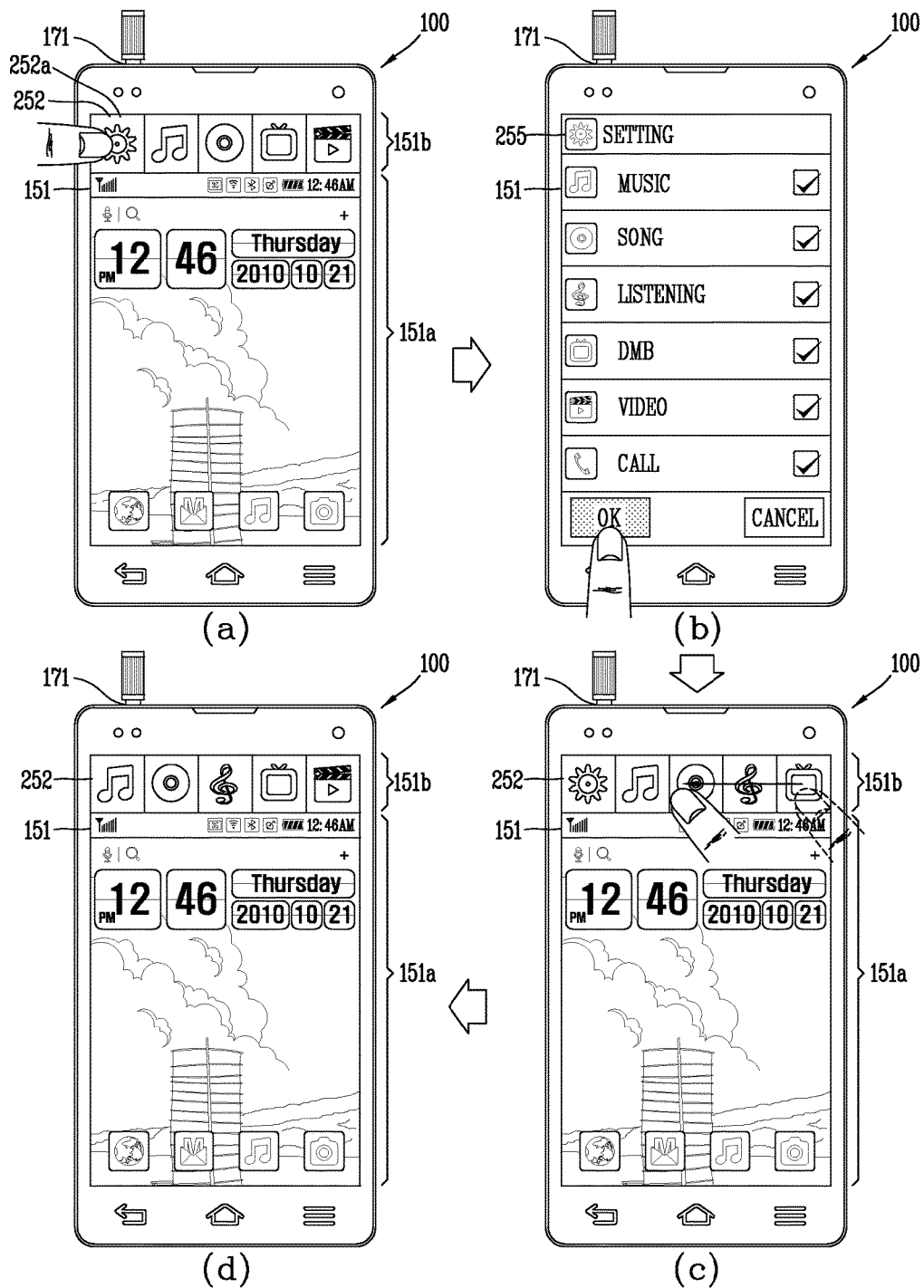
Figure 13:
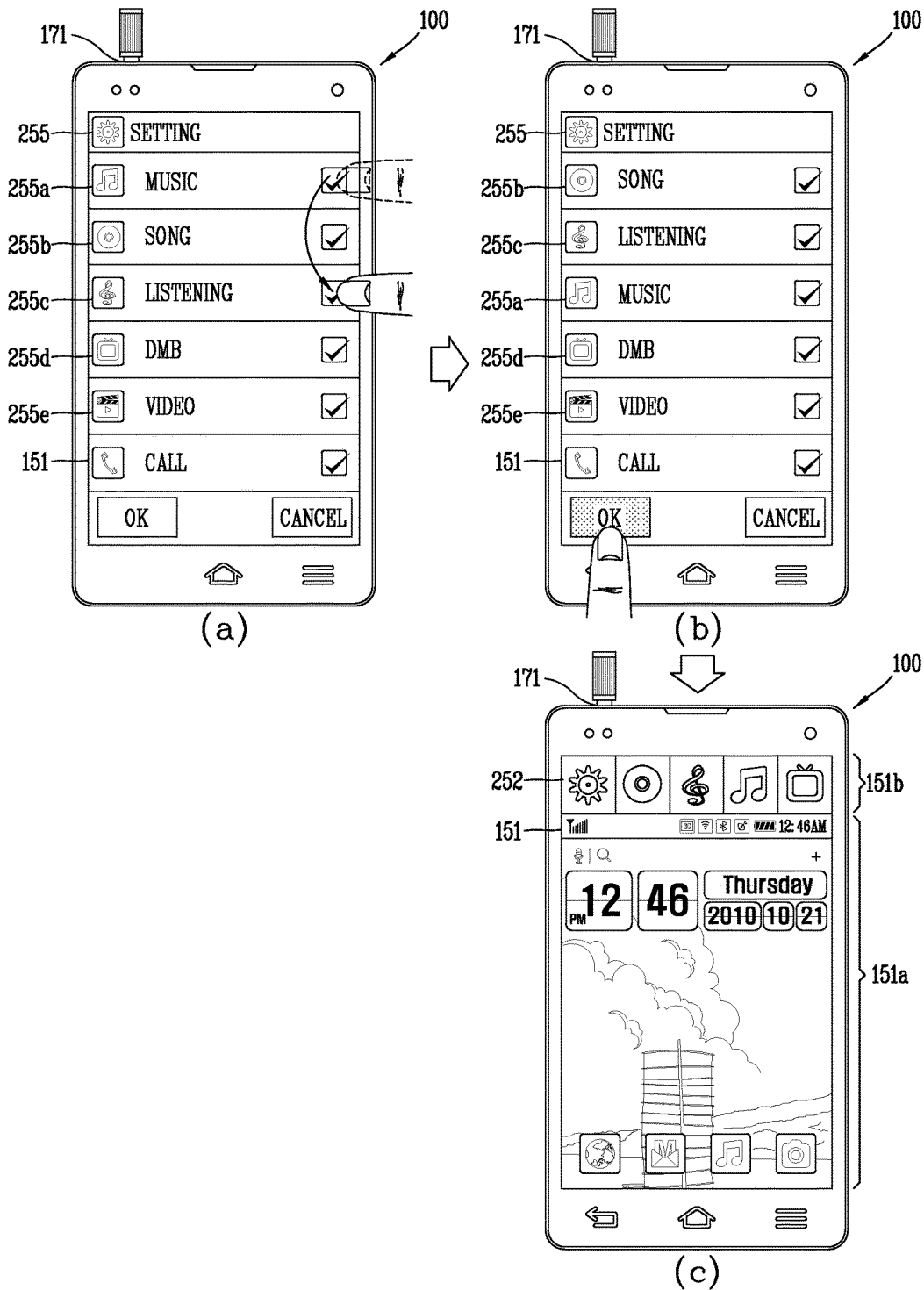

FIGS. 12 and 13 are conceptual views illustrating an embodiment of editing the execution menu 252.

Referring to FIG. 12A, an icon (hereinafter, referred to as a "setting icon") 252a for setting icons displayed on the execution menu 252 may be displayed on the execution menu 252.

At this time, when the setting icon 252a is selected, as illustrated in FIG. 12B, the controller 180 may display a setting screen 255 for selecting at least one of the type of the icon and the arrangement method of the icon to be displayed in the execution menu 252 on the display unit 151.

As illustrated in the drawing, icons corresponding to a plurality of applications may be displayed on the setting screen 255. The user may add or delete an icon to be displayed on the execution menu 252 through the setting screen 255.

Then, as illustrated in FIG. 12C, icons configured on the setting screen 255 may be displayed on the execution menu 252. Meanwhile, when a predetermined touch input (for example, drag input) is sensed on the execution menu 252 in case that the configured icons are all not displayed on one screen, as illustrated in FIG. 12D, the controller 180 may display the other icons on the execution menu 252.

Furthermore, though not shown in the drawing, icons displayed on the execution menu 252 may be edited in a state that the execution menu 252 is displayed. Specifically, when a predetermined touch input (for example, long touch input) is sensed on any one of icons displayed on the execution menu 252, the controller 180 may display an editing menu for editing the touched icon on the display unit 151.

Referring to FIG. 13, the controller 180 may configure the arrangement order of icons to be displayed on the execution menu 252.

Specifically, as illustrated in FIG. 13A, the controller 180 may display the setting screen 255 for selecting the arrangement order of icons to be displayed on the execution menu 252 on the display unit 151.

As illustrated in the drawing, icons 255a-255e corresponding to a plurality of applications may be displayed on the setting screen 255. At this time, when any one 255a of the icons 255a-255e is dragged in the direction of another one 255c, as illustrated in FIG. 13B, the controller 180 may change the order of the icons 255a-255e.

Then, as illustrated in FIG. 13C, icons may be displayed on the execution menu 252 with the order changed on the setting screen 255.

Figure 14:
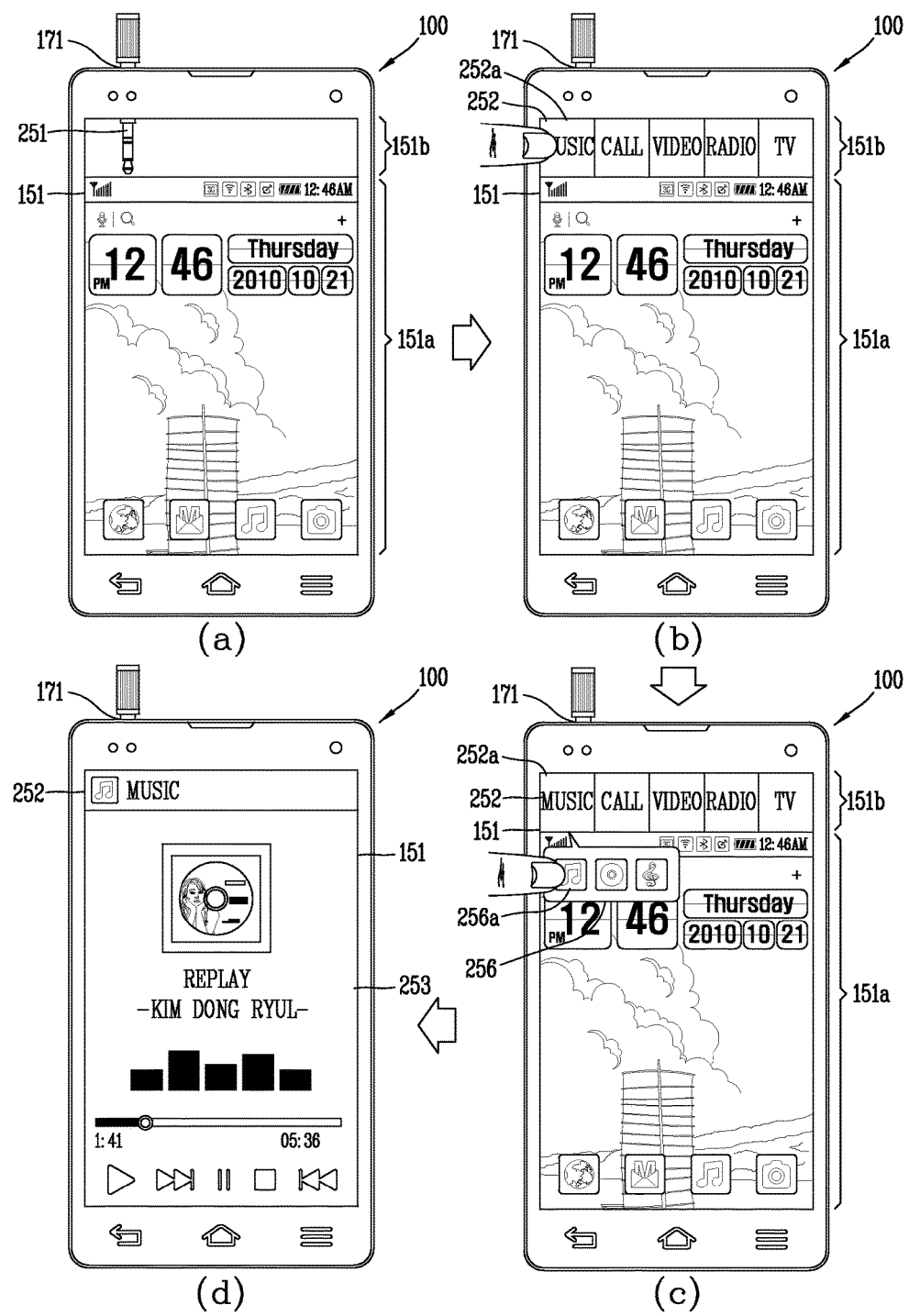

FIG. 14 is a conceptual view illustrating an embodiment of displaying a group icon of applications as the execution menu 252.

Referring to FIGS. 14A and 14B, the controller 180 may display at least one execution menu 252 in a region from which an image having the shape of an earphone connector disappears.

At this time, the controller 180 may recommend applications associated with the earphone, and group the recommended applications into a plurality of groups. For example, a plurality of groups may include a music group, a call group, a video group, a radio group and a TV group. The controller 180 may display group icons corresponding to a plurality of groups, respectively, on the execution menu 252.

When any one (for example, music group icon) 252a of the group icons is selected, as illustrated in FIG. 14C, the controller 180 may display a popup window 256 including icons corresponding to applications grouped into a music group on the display unit 151.

At this time, as illustrated in the drawing, the selected music group icon 252a may be displayed to be distinguished from the other group icons. For example, the selected music group icon 252a may display at least one of the color, shape, size, brightness and three-dimensional depth value in a different manner from that of the other icons.

On the other hand, when any one 256a of the icons displayed on the popup window 256 is selected, the controller 180 may execute an application corresponding to the selected icon 256a. Then, as illustrated in FIG. 14D, the controller 180 may display the execution screen 253 of an application corresponding to the selected icon 256a on the display unit 151.

FIG. 15 is a conceptual view illustrating an embodiment of immediately executing an application when an external device is withdrawn from the interface unit 170.

Referring to FIG. 15A, the interface unit 170 may include an antenna port 173 configured to withdraw a DMB antenna. The display unit 151 may display a home screen 257.

At this time, when it is sensed that a DMB antenna is withdrawn from the antenna port 173 by a predetermined length (for example, first length), the controller 180 may execute a DMB application. The controller 180 may display the execution screen 258 of the DMB application on the display unit 151.

Specifically, as illustrated in FIG. 15B, the controller 180 may detect length information in which the DMB antenna is withdrawn from the antenna port 173. The controller 180 may divide the display unit 151 into the first and the second region 151a, 151b while allowing at least part of the home screen 257 previously displayed on the display unit 151 to disappear based on the detected length information. The controller 180 may display the home screen 257 in the first region 151a, and display the execution screen 258 of the DMB application in the second region 151b.

As the DMB antenna is subsequently withdrawn from the antenna port 173, the controller 180 may subsequently change the size of the first and the second region 151a, 151b. Accordingly, the size of the execution screen 258 of the DMB application may be also gradually increased.

Then, when it is sensed that the DMB antenna is withdrawn from the antenna port 173 by a predetermined length (for example, second length), the controller 180 may allow the home screen 257 to disappear from the display unit 151, and display the execution screen 258 of the DMB application in the entire region of the display unit 151.

Though not shown in the drawing, the foregoing embodiment may be applicable while a DMB antenna is inserted into the antenna port 173. Specifically, while the DMB antenna is inserted into the antenna port 173 the size of the first region 151a can be gradually increased but the size of the second region 151b can be decreased.

Accordingly, the size of the home screen 257 can be gradually increased but the size of the virtual keypad 258 can be gradually decreased. Then, when it is sensed that the DMB antenna is inserted into the antenna port 173 by a predetermined length, the controller 180 may terminal the DMB application, and display the home screen 257 in the entire region of the display unit 151.

FIG. 16 is a conceptual view illustrating screen information displayed on the display unit 151 when an external device is coupled to the interface unit 170 in a state that a lock screen is displayed on the display unit 151.

Referring to FIG. 16A, the display unit 151 may display a lock screen 259 in a lock mode.

In general, the lock mode of the mobile terminal 100 denotes an operation mode for limiting the user's input such as a touch input applied to the display unit 151. In addition, the lock mode may be released based on the limited user's input.

The lock screen 259 may be displayed in a lock mode on the display unit 151. Here, the lock screen 259 denotes a specific screen (for example, a standby screen, a home screen, etc.) or a screen formed to block or limit the exposure of other images. The lock screen 259 may include a window for receiving a password or receiving a specific pattern.

When the earphone connector is coupled to the earphone port 171 in a state that the lock screen 259 is displayed, as illustrated in FIG. 16B, the controller 180 may display graphic data indicating that the body is connected to the earphone on the display unit 151.

At this time, as illustrated in the drawing, the controller 180 may divide the display unit 151 into the first and the second region 151a, 151b while allowing at least part of the lock screen 259 to disappear. The controller 180 may display the lock screen 259 in the first region 151a of the display unit 151 and graphic data in the second region 151b.

On the other hand, though not shown in the drawing, the controller 180 may display graphic data to be overlapped with the lock screen 259.

Then, as illustrated in FIG. 16C, when a predetermined period of time has passed in a state that graphic data is displayed on the display unit 151, the controller 180 may allow the graphic data to disappear, and display at least one execution menu 252 in a region from which the graphic data disappears. Here, the execution menu 252 may include icons 252a-252e corresponding to an application associated with the earphone.

As illustrated in the drawing, the execution menu 252 may include an icon corresponding to an application associated with music play, an icon corresponding to an application associated with DMB play, an icon corresponding to an application associated with video play, and the like.

On the other hand, as illustrated in the drawing, icons 252a, 252c corresponding to an application for which the execution is allowed in a lock mode and icons 252b, 252d, 252e corresponding to an application for which the execution is disallowed among icons 252a-252e displayed on the execution menu 252 may be displayed in a distinguished manner from one another.

As illustrated in the drawing, the icons 252b, 252d, 252e corresponding to an application for which the execution is disallowed in a lock mode may be displayed with a predetermined color.

Then, though not shown in the drawing, when either one of the icons 252a, 252c corresponding to an application for which the execution is allowed in a lock mode is selected, the controller 180 may execute an application corresponding to the selected icon. The controller 180 may display the execution screen of an application corresponding to the selected icon on the display unit 151.

On the other hand, though not shown in the drawing, when any one of the icons 252b, 252d, 252e corresponding to an application for which the execution is disallowed in a lock mode is selected, the controller 180 may display a popup window containing content for requesting the input of a password or specific pattern on the lock screen 259.

Furthermore, though not shown in the drawing, even when the mobile terminal 100 is in a sleep mode, the foregoing embodiments described in FIGS. 1 through 16 may be applicable. The sleep mode denotes a mode in which screen information is not displayed on the display unit 151, and a touch input applied to the display unit 151 is not sensed.

Specifically, when an earphone connector is connected to the earphone port 171 in a state that the mobile terminal 100 is in a sleep mode, the controller 180 may release the sleep mode. Furthermore, the controller 180 may display at least one of graphic data indicating that the earphone connector has been connected and an execution screen for executing a function associated with the earphone on the display unit 151.

Furthermore, according to an embodiment disclosed in the present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a touch screen;
    an interface unit for connecting to an earphone; and a controller configured to:
    detect a connection of the interface unit to the earphone in a state that the mobile terminal is in a sleep mode in which screen information is not displayed, and a touch input applied to the touch screen is not sensed,
    release the sleep mode when the earphone is connected to an earphone port in the sleep mode such that the screen information can be displayed,
    control the touch screen to divide a display area of the touch screen into a first region and a second region when the earphone is connected to the interface unit,
    control the touch screen to display a graphic object indicating that the earphone is connected to the interface unit on the first region, wherein
    the screen information is displayed on the second region and a touch input applied to the touchscreen is not sensed,
    control the touch screen to display at least one icon corresponding to at least one recommended application related to the earphone on the first region and to sense a touch input applied to the touch screen in a lock mode when a predetermined period of time is determined to have passed in a state that the graphic object is displayed on the touch screen, wherein
    the graphic object, indicating that the earphone is connected to the interface unit, is to disappear from the first region when the at least one icon is displayed on the first region, wherein
    the at least one recommended application is determined based on usage statistic information being information associated with which application is executed related to the earphone at the mobile terminal based on a user's selection,
    control the touch screen to display first icons corresponding to an application for which execution is allowed in the lock mode and second icons corresponding to an application for which execution is disallowed in the lock mode in a distinguished manner;
    when one of the first icons is selected, executing an application corresponding to the selected first icon in the lock mode,
    when one of the second icons is selected, control the touch screen to display a popup window containing content for requesting input of a password or specific pattern on a lock screen in the lock mode, and
    control the touch screen to display an application corresponding to the selected one of the second icons after the lock screen is released in response to the input of the password or specific pattern.

2. The mobile terminal of claim 1, wherein the controller collects the usage statistic information associated with which application is executed related to the earphone at the mobile terminal by the user's selection.

3. The mobile terminal of claim 1, wherein the at least one recommended application is at least one of a music play application or a video play application.

4. The mobile terminal of claim 3, wherein the screen information comprises one of a lock screen information and a home screen page.

5. The mobile terminal of claim 3, wherein:
    the screen information comprises a lock screen,
    the interface unit comprises an earphone port configured to be attachable with the earphone, and
    the at least one icon is displayed on the lock screen in a lock state when the earphone is connected to the earphone port.

6. The mobile terminal of claim 1, wherein the at least one icon disappears from the touch screen when a touch input is not sensed on the touch screen for the predetermined period of time.

7. The mobile terminal of claim 1, wherein the at least one icon disappears from the touch screen based on a touch input applied to a region where the at least one icon is not displayed in a state that the at least one icon is displayed on the touch screen.

* * * * *